(12) United States Patent
Babikov et al.

(10) Patent No.: US 9,644,599 B2
(45) Date of Patent: May 9, 2017

(54) ENHANCED DISK ACTUATOR MODELING

(71) Applicant: Autodesk, Inc., San Rafael, CA (US)

(72) Inventors: Pavel Babikov, Toronto (CA);
Francesco Iorio, Toronto (CA)

(73) Assignee: Autodesk, Inc., San Rafael, CA (US)

(*) Notice: Subject to any disclaimer, the term of this patent is extended or adjusted under 35 U.S.C. 154(b) by 492 days.

(21) Appl. No.: 14/215,937

(22) Filed: Mar. 17, 2014

(65) Prior Publication Data

US 2014/0278152 A1 Sep. 18, 2014

Related U.S. Application Data

(60) Provisional application No. 61/800,542, filed on Mar. 15, 2013.

(51) Int. Cl.
*F03B 3/04* (2006.01)
*F03B 11/02* (2006.01)
(Continued)

(52) U.S. Cl.
CPC .......... *F03B 3/04* (2013.01); *F03B 11/02* (2013.01); *F03B 17/061* (2013.01); *F03D 1/04* (2013.01);
(Continued)

(58) Field of Classification Search
CPC ...... F03B 3/04; F03B 17/061; F05B 2260/04; Y02E 10/72
See application file for complete search history.

(56) References Cited

PUBLICATIONS

Consul et al., Influence of Solidity on the Performance of a Cross-Flow Turbine, 2009, Proceedings of the 8th European Wave and Tidal Energy Conference, Uppsala, Sweden, pp. 484-493.*

(Continued)

*Primary Examiner* — Toan Le
(74) *Attorney, Agent, or Firm* — Fish & Richardson P.C.

(57) ABSTRACT

Methods, systems, and apparatus, including computer programs encoded on computer storage media, for modeling turbine parameters. One of the methods includes obtaining, along multiple points of a blade of a turbine from a minimum radius rmin of the blade to a maximum radius rmax of the blade, lift coefficients $C_{yi}$ and drag coefficients $C_{xi}$. At the multiple points of the blade from rmin to rmax, corresponding components of an upstream fluid flow velocity vector $u_{h,Ri}$ and $u_{\varphi,Ri}$ and components of a downstream fluid flow velocity $u_{h,Li}$ and $u_{\varphi,Li}$ are obtained. Averaged directions $\beta_i$ of the upstream and downstream fluid flow velocity vectors are computed using the components of the upstream fluid flow velocity vector $u_{h,Ri}$ and $u_{\varphi,Ri}$ and the components of the downstream fluid flow velocity $u_{h,Li}$ and $u_{\varphi,Li}$. The total torque M of the turbine is computed including summing, from rmin to rmax, $(C_{xi} \sin \beta_i + C_{yi} \cos \beta_i)$.

21 Claims, 5 Drawing Sheets

(51) Int. Cl.
*F03B 17/06* (2006.01)
*F03D 1/04* (2006.01)

(52) U.S. Cl.
CPC ... *F05B 2240/122* (2013.01); *F05B 2240/133* (2013.01); *F05B 2260/84* (2013.01); *Y02E 10/223* (2013.01); *Y02E 10/28* (2013.01); *Y02E 10/72* (2013.01)

(56) References Cited

PUBLICATIONS

Glauert, H. *Windmills and Fans.* In *Aerodynamic Theory*, vol. IV. W.F. Durand (ed). Dover Publications Inc., New York 1963. 34 pages.

*Froude's Momenum Theory for an Actuator Disk.* The University of Strathclyde—Energy Systems Research Unit (ESRU). Last updated on May 19, 2006. Retrieved on Mar. 7, 2014. Retrieved from the internet: URL<http://www.esru.strath.ac.uk/EandE/Web_sites/05-06/marine_renewables/technology/Froude.htm>. 5 pages.

Mikkelsen, Robert. *Actuator Disc Methods Applied to Wind Turbines.* Dissertation submitted to Technical University of Denmark, Fluid Mechanics, Department of Mechanical Engineering, Jun. 2003. 121 pages.

Betz, A. *Das Maximum des theoretisch möglichen Ausnützung des Windes durch Windmotoren*, Zeitschrifft für das gesamte Turbinewesen, vol. 26, p. 307, Sep. 20, 1920. English translation *The Maximum of the Theoretically Possible Exploitation of Wind by Means of a Wind Motor.* 7 pages.

Laursen, J. et al. *3D CFD Quantification of the Performance of a Multi-Megawatt Wind Turbine.* The Science of Making Torque from Wind, Journal of Physics: Conference Series 75. IOP Publishing Ltd., 2007.

Hartwanger, D. et al. *3D Modeling of Wind Turbine Using CFD.* NAFEMS Conference 2008, United Kingdom, Jun. 2008. 14 pages.

Ivanell, S. *Numerical Computations of Wind Turbine Wakes.* Technical Reports from Royal Institute of Technology Linnre Flow Centre, Department of Mechanics, Stockholm, Sweden, Jan. 2009. 100 pages.

Battisti, L. et al. *Inverse Design-Momentum, a Method for the Preliminary Design of Horizontal Axis Wind Turbines.* The Science of Making Torque from Wind, Journal of Physics: Conference Series 75. IOP Publishing Ltd., 2007. 14 pages.

* cited by examiner

ENHANCED DISK ACTUATOR MODELING

CROSS-REFERENCE TO RELATED APPLICATIONS

This application claims the benefit under 35 U.S.C. §119 (e) of the filing date of U.S. Provisional Patent Application No. 61/800,542, filed on Mar. 15, 2013, entitled "Enhanced Disk Actuator Modeling," the entirety of which is herein incorporated by reference.

BACKGROUND

This specification relates to computer-implemented modeling of gas and liquid flows in turbines.

Computer simulation of gas and liquid flows in axial-flow turbo machines is a sophisticated class of applied computational fluid dynamics problems due to combination of geometrical complexity of the computational domain and the large impact of additional physical effects, such as flow turbulence and separation, blade tip vertices, and wake instability. High fidelity discrete models based on 3D unsteady Navier-Stokes equations result in computationally demanding and expensive simulations.

Simpler models for such turbine systems can be constructed by a disk actuator model using 2D Navier-Stokes equations in which all blade wheels are modeled in an unducted turbine of zero thickness in an incompressible fluid of constant density.

SUMMARY

An Energy Extractor Disk Actuator model for simulating axial-flow propellers, fans, turbine and turbo compressor impellers and blade wheels is suggested along with qualitative evaluation of its fidelity. The model is intended for preliminary cost-effective engineering analysis of turbo machines based on 2D (axially symmetric) Euler or Navier-Stokes equations. It uses the same approximate representation of a blade wheel as an "equivalent" axially symmetric disk actuator as classical Betz' model [1] and Glauert's Blade Element Momentum Theory [2]. However, the suggested model is capable of supporting a significantly wider range of practical applications, since a) it does not use initial assumptions regarding magnitude of radial flow speed, b) it takes into account finite thickness of a blade wheel, and c) it is equally applicable to compressible flows, in contrast to the Betz' and Glauert's approaches.

In general, one innovative aspect of the subject matter described in this specification can be embodied in methods that include the actions of computing a total torque of a turbine from lift and drag coefficients of the turbine, including obtaining, along multiple points of a blade of a turbine from a minimum radius rmin of the blade to a maximum radius rmax of the blade, lift coefficients $C_{yi}$ and drag coefficients $C_{xi}$; obtaining, at the multiple points of the blade from rmin to rmax, corresponding components of an upstream fluid flow velocity vector $u_{h,Ri}$ and $u_{\varphi,Ri}$ and components of a downstream fluid flow velocity $u_{h,Li}$ and $u_{\varphi,Li}$; computing averaged directions $\beta_i$, of the upstream and downstream fluid flow velocity vectors using the components of the upstream fluid flow velocity vector $u_{h,Ri}$ and $u_{\varphi,Ri}$ and the components of the downstream fluid flow velocity $u_{h,Li}$ and $u_{\varphi,Li}$; and computing the total torque M of the turbine including summing, from rmin to rmax, ($C_{xi}$ sin $\beta_i$+$C_{yi}$ cos $\beta_i$). Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The actions include obtaining, from rmin to rmax, averaged dynamic pressures $q_i$; using corresponding components of the upstream fluid flow velocity vector $u_{h,Ri}$ and $u_{\varphi,Ri}$ and corresponding components of the downstream fluid flow velocity $u_{h,Li}$ and $u_{\varphi,Li}$, wherein the total torque M of the turbine is further based on the averaged dynamic pressures $q_i$. computing the total torque M of the turbine comprises summing, from rmin to rmax, $q_i$ ($C_{xi}$ sin $\beta_i$+$C_{yi}$ cos $\beta_i$). The actions include obtaining a number of blades N of the turbine; obtaining, from rmin to rmax, chord lengths $L_i$ of the blade; and computing, from rmin to rmax, solidity factors $\sigma_i$ according to $L_i \times N/2\pi \cdot r$, wherein r is the length of the radius from rmin to rmax, wherein the total torque M of the turbine is further based on the solidity factors $\sigma_i$. Computing the total torque M of the turbine comprises summing, from rmin to rmax, $\sigma_i \cdot (C_{xi}$ sin $\beta_i$+$C_{yi}$ cos $\beta_i)$. The actions include computing the output mechanical power of the turbine P by multiplying the total torque M by turbine rotational speed $\Omega$. The actions include computing, from rmin to rmax, enthalpy jump values from an upstream enthalpy value $H_{Ri}$ to a downstream enthalpy value $H_{Li}$; and computing the total average power of the turbine $P_{avg}$ including summing, from rmin to rmax, the enthalpy jump values. $P_{avg}$ is given by:

$$P_{avg} = 2\Pi \int_{rmin}^{rmax} r \cdot \rho \cdot u_{hi}(H_R - H_L) \cdot dr,$$

where r is the radius of the turbine blade. The actions include computing the coefficient of hydrodynamic efficiency $\eta$ according to:

$$\eta = \frac{M \times \Omega}{P_{avr}},$$

wherein $\Omega$ is the turbine rotational speed. The enthalpy jump values for an incompressible fluid are given by:

$$H_{Ri} - H_{Li} = \frac{p_{Ri} - p_{Li}}{\rho} + \frac{u_{\varphi,Ri}^2 - u_{\varphi,Li}^2}{2},$$

wherein, from rmin to rmax, $p_{Ri}$ are upstream pressure values, $p_{Li}$ are downstream pressure values, and p is the density of the fluid. The enthalpy jump values for a compressible fluid are given by:

$$H_{Ri} - H_{Li} = \left[E_{int,R} + \frac{p_{Ri}}{\rho_{Ri}} + \frac{u_{h,Ri}^2 + u_{\varphi,Ri}^2}{2}\right] - \left[E_{int,L} + \frac{p_{Li}}{\rho_{Li}} + \frac{u_{h,Li}^2 + u_{\varphi,Li}^2}{2}\right],$$

wherein $E_{int}$ represents the internal energy of the fluid per unit mass and depends on pressure p and temperature of the fluid T, and wherein $P_{Ri}$ are upstream pressure values, $p_{Li}$ are downstream pressure values, $\rho_{Ri}$ are upstream density values, $\rho_{Li}$ are downstream density values of the fluid.

In general, another innovative aspect of the subject matter described in this specification can be embodied in methods that include the actions of computing a total torque of a turbine from lift and drag coefficients of the turbine, including obtaining, along multiple points of a blade of a turbine from a minimum radius rmin of the blade to a maximum radius rmax of the blade, lift coefficients $C_{yi}$ and drag coefficients $C_{xi}$; obtaining, at the multiple points of the blade from rmin to rmax, corresponding components of an upstream fluid flow velocity vector $u_{hi}$ and $u_{\phi I}$ and components of a downstream fluid flow velocity $u_{hi}$ and $u_{\phi I}$; computing averaged directions $\beta_i$ of the upstream and downstream fluid flow velocity vectors using the components of the upstream fluid flow velocity vector $u_{hi}$ and $u_{\phi I}$ and the components of the downstream fluid flow velocity $u_{hi}$ and $u_{\phi I}$; and computing the total drag X of the turbine including summing, from rmin to rmax, $(C_{yi} \sin \beta_i - C_{xi} \cos \beta_i)$. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The actions include obtaining, from rmin to rmax, averaged dynamic pressures $q_i$; using corresponding components of the upstream fluid flow velocity vector $u_{hi}$ and $u_{\phi I}$ and corresponding components of the downstream fluid flow velocity $u_{hi}$ and $u_{\phi I}$, wherein the total torque M of the turbine is further based on the averaged dynamic pressures $q_i$. Computing the total drag X of the turbine comprises summing, from rmin to rmax, $q_i \cdot (C_{yi} \sin \beta_i - C_{xi} \cos \beta_i)$. The actions include obtaining a number of blades N of the turbine; obtaining, from rmin to rmax, chord lengths $L_i$ of the blade; and computing, from rmin to rmax, solidity factors $\sigma_i$ according to $L_i \times N/2\pi \cdot r$, wherein r is the length of the radius from rmin to rmax, wherein the total torque M of the turbine is further based on the solidity factors $\sigma_i$. Computing the total drag X of the turbine comprises summing, from rmin to rmax, $\sigma_i \cdot (C_{yi} \sin \beta_i - C_{xi} \cos \beta_i)$.

Particular embodiments of the subject matter described in this specification can be implemented so as to realize one or more of the following advantages. A system can compute more accurate parameters of a turbine without the computational complexity of a full 3D model. The system can use 2D equations that are more accurate than a classical disk actuator model. The system can compute turbine parameters for ducted or unducted turbines, multistage turbines, turbines with stators or rotating blades, compressible or incompressible fluids, and turbines having a finite thickness.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
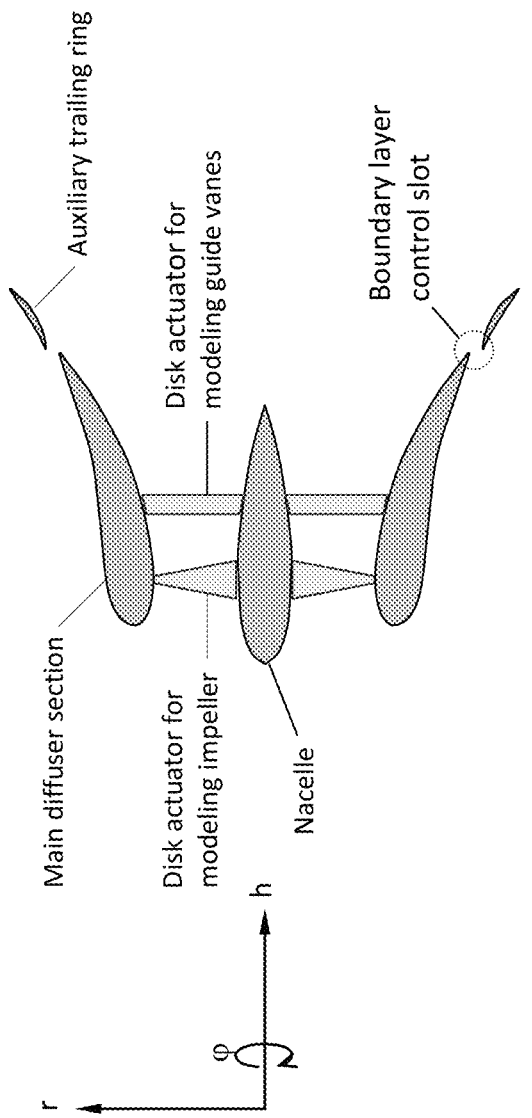
FIG. 1 illustrates the lateral section of a wide angle ducted turbine with slot for boundary layer control.

Computer simulation of gas and liquid flows in axial-flow turbo machines constitutes one of the most sophisticated classes of applied computational fluid dynamics (CFD) problems due to combination of geometrical complexity of computational domain, essentially unsteady flow pattern, and large impact of additional physical effects, such as flow turbulence and separation, blade tip vertices, wake instability, etc. So, high fidelity discrete models based on 3D unsteady Navier-Stokes equations result in extremely computationally demanding and expensive simulation (see, for example, [3-5]). At preliminary stages of turbine design, for geometrically optimizing blade shapes and other components of turbine assembly it is necessary to run multiple problem variants, so such precise models are unusable because of enormous amount of required computer resources. In this case, a simplified (approximate) flow model could offer an appropriate cost-effective modeling tool for preliminary design.

Approximate models for simulating turbines are usually constructed on the basis of various versions of the Energy Extractor Disk Actuator principle originally suggested by A. Betz [1], and later extended by H. Glauert [2]. The Blade Element Momentum Theory (BEM) intended for approximately representing hydrodynamic impact of an "equivalent" disk actuator on flow in a turbine in terms of hydrodynamic properties of blade sections, had been also developed by the latter researcher. Present-day numerical techniques aimed at simplified design of turbines use the classic disk actuator principle and BEM in combination with analytic or semi-analytic approximations of upstream and downstream flows (see, for example, [6]), or numerically simulating upstream and downstream flows using 2D Navier-Stokes equations (see, for example, [7]). In a number of most recent researches the disk actuator principle or its further extension for fully 3D flows, the Actuator Line Model (ALM), is used for modeling blade wheels in combination with full 3D Reynolds-averaged Navier-Stokes equations (see, for example, [5,7]). However, as long as such hybrid approaches require solving a full 3D CFD problem with turbulence and/or large eddy models, i.e. restore original computational complexity, they cannot be considered as cost-effective solutions.

A more general axially symmetric disk actuator model is suggested below. Due to taking into account extra physical effects, such as finite radial flow speed, finite thickness of disk actuator, and fluid compressibility, it provides significantly wider range of practical applications as compared with previously developed similar models.

The system of conservation laws describing fluid motion in a generalized curvilinear time-dependent coordinates ($\xi$, $\eta$, $\zeta$), i.e. Navier-Stokes equations, can be written in the following divergent form:

$$\frac{\partial Q}{\partial t} + \frac{\partial (E - E_v)}{\partial \xi} + \frac{\partial (G - G_v)}{\partial \eta} + \frac{\partial (F - F_v)}{\partial \varsigma} = S - S_v, \quad (1)$$

where Q is vector of mass, momentum, and energy densities; E, G, and F are vectors of convective fluxes in respective directions $\xi$, $\eta$, and $\zeta$; $E_v$, $G_v$, and $F_v$ are vectors of dissipative fluxes; S and $S_v$ are vectors of densities of respective convective and dissipative sources. Explicit expressions for those vectors depend on both physical properties of the fluid and selected coordinate system ($\xi$, $\eta$, $\zeta$). If all dissipative fluxes and sources are zero $E_v$=0, $G_v$=0, $F_v$=0, and $S_v$=0, then Navier-Stokes equations (1) reduce to the Euler ones.

When using a differential turbulence model, system (1) should be extended with auxiliary equations describing evolution of local parameters of turbulence, such as average kinetic energy of turbulent motion k and its dissipation rate $\epsilon$ in the (k–$\epsilon$) model. Also, when modeling a flow of non-equilibrium chemically reacting gas mixture, system (1) should be extended with extra equations describing transition and diffusion of mass concentrations of chemical components with source terms defining rates of production of the components in chemical reactions. However, in our considerations below it is supposed that turbulence and non-equilibrium chemical reactions do not create significant impact on free stream flow structure outside of boundary layers, so the mentioned additional equations are not required.

Let's now consider typical problem of approximately modeling an axial-flow turbo machine. An example of such problem, ducted hydro turbine with boundary layer control, is illustrated in FIG. 1 below. As long as simplified engineering model implies steady-state axially symmetric flow field, the latter can be compactly represented in cylindrical coordinate system (h, r, $\phi$) whose cylindrical axis coincides with the turbine axis (see FIG. 1). In this case $\xi$=h, $\eta$=r, $\zeta$=$\phi$, $\partial Q/\partial t$=0, $\partial(F-F_v)/\partial\zeta$=0, and Navier-Stokes equations (1) take the following form:

$$\frac{\partial(E-E_v)}{\partial h} + \frac{\partial(G-G_v)}{\partial r} = S - S_v \qquad (2)$$

At high Reynolds numbers dissipative terms $E_v$, $G_v$, $S_v$ are negligibly small and can be omitted in free stream areas, i.e. outside of boundary layers.

When constructing energy extractor disk actuator model, all blade wheels of a turbo machine are replaced with azimuth-uniform disks of finite or zero thicknesses extracting the same average amounts of momentum and energy as real blade wheels. For example, ducted hydro turbine in FIG. 1 contains two such wheels: turbine impeller and guide vane wheel, so that two respective disk actuators should be used. For multi-staged turbines and turbo compressors each rotor and stator blade wheel should be modeled by a disk actuator, etc.

Therefore, each disk actuator approximately represents stream volume swept by respective blade wheel and works as source or sink of momentum and energy. When using disk actuators in combination with axially symmetric Navier-Stokes equations (2), it is supposed that equations (2) are responsible for description of the flow field everywhere outside of swept volumes, while disk actuators provide "jump conditions" connecting flow field parameters at upstream ("L") and downstream ("R") sides of respective blade wheels. Derivation of the jump conditions is presented below.

Vectors of convective fluxes E, G and sources S in axially symmetric Navier-Stokes equations (2) can be expressed in terms of flow parameters as follows:

$$E = \begin{Vmatrix} r\rho u_h \\ r(\rho u_h^2 + p) \\ r\rho u_h u_r \\ r^2 \rho u_h u_\varphi \\ r\rho u_h H^{(*)} \end{Vmatrix}, \quad G = \begin{Vmatrix} r\rho u_r \\ r\rho u_h u_r \\ r(\rho u_r^2 + p) \\ r^2 \rho u_r u_\varphi \\ r\rho u_r H^{(*)} \end{Vmatrix}, \quad S = \begin{Vmatrix} 0 \\ rf_h \\ p + \rho u_\varphi^2 + rf_r \\ r^2 f_\varphi \\ re \end{Vmatrix} \qquad (3)$$

where uh, ur, and u$\phi$ are components of velocity vector in respective directions h, r, and $\phi$, $\rho$ is fluid density, p is static pressure, H(*) is total specific enthalpy of fluid per unit mass. Source terms fh, fr, and f$\phi$ represent volume densities of components of external forces, and e is volume density of energy sources.

Although expressions (3) are valid for both compressible and incompressible fluids, standard definitions of the total specific enthalpy H(*) and physical meaning of the energy equation are different. For incompressible fluids enthalpy H* is usually introduced total mechanical energy, i.e. sum of potential and kinetic energies, per unit mass $$H^* = p/\rho + u^2/2 = p/\rho + (u_h^2 + u_r^2 + u_\varphi^2)/2. \qquad (4)$$

On the other hand, definition of enthalpy H for compressible fluids includes additional term representing internal (thermal) energy per unit mass $$H = E_{int} + p/\rho + u^2/2 = E_{int} + p/\rho + (u_h^2 + u_r^2 + u_\varphi^2)/2, \qquad (5)$$

where $E_{int}$(p, T) is internal energy of the fluid per unit mass, and T is fluid temperature. For example, in case of a thermally perfect gas $E_{int} = C_v T/\mu$ and (5) reduces to $$H = C_v T/\mu + p/\rho + u^2/2 = C_p T/\mu + (u_h^2 + u_r^2 + u_\varphi^2)/2, \qquad (6)$$

where $C_v$ and $C_p$ are specific heat capacities at constant volume and pressure, respectively, and $\mu$ is molar mass of the gas. System of Navier-Stokes equations (1) for a compressible gas includes density $\rho(t,\xi,\eta,\zeta)$ as an additional unknown function as compared with system (1) for incompressible fluid, so equation of gas state $\rho = \rho(p, T)$ has to be used for closing the problem.

As long as expression (4) does not include internal energy Eint, it does not represent a conservative physical value. Therefore, if energy equations for an incompressible fluid is written in terms of the function (4), it does not reflect an independent conservation law, because H* may dissipate due to the impact of viscous friction and heat transfer (Sv≠0) at finite Reynolds numbers. In fact, it can be shown that the considered equation directly follows from the mass and momentum conservation laws. On the other hand, energy equation for a compressible gas written in terms of the function (5) or (6) does represent an independent conservation law defining temperature distribution.

Figure 2:
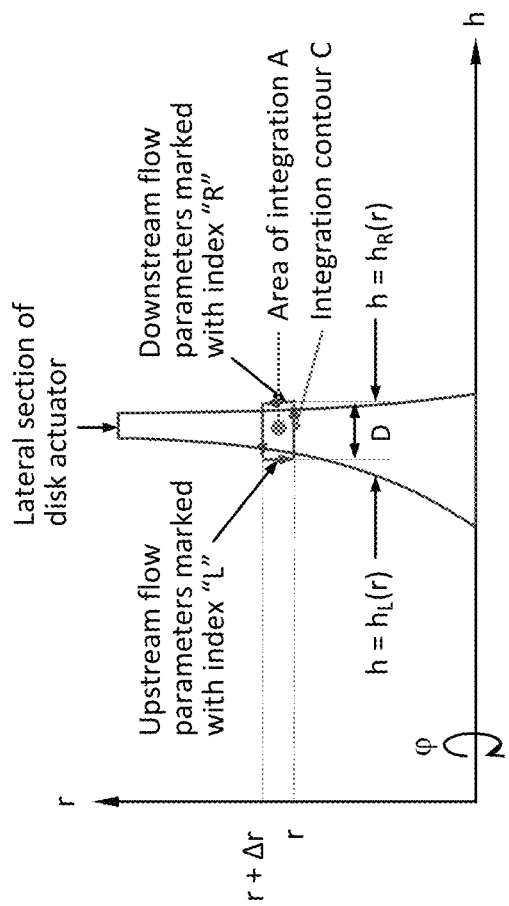
FIG. 2 illustrates the integration area and contour in a lateral section of a disk actuator.

Vector equation (2) can be re-written in the scalar form $$(\partial E_k/\partial h) + (\partial G_k/\partial r) = S_k, \qquad (7)$$

where Ek, Gk and Sk denote k-th scalar components of the vectors (E–$E_v$), (G–$G_v$), and (S–$S_v$), respectively. Index k in (7) varies from 1 to 5, thus representing continuity equation (k=1), h-momentum equation (k=2), r-momentum equation (k=3), $\phi$-momentum equation (k=4), and energy equation (k=5). Let's now select an infinitely narrow integration area A in plane (h, r), so that its lower and upper bounds cross lateral section of disk actuator and are located at radii r and r+$\Delta$r, respectively, while its left (h=$h_L$(r)) and right (h=$h_R$(r))

bounds are located in the areas of free stream closely adjoining left and right sides of the disk, see FIG. 2. In our considerations below, flow parameters at the left and right bounds of the area A will be marked with the indices "L" and "R", respectively.

Integrating scalar equations (7) over area A and applying the 1-st Green's integral formula, yields $$\oint_C (E_k \cdot dr - G_k \cdot dh) = \iint_A S_k \cdot dr \cdot dh, \quad (8)$$

where C is the contour bounding area of integration A. Since height $\Delta r$ of the area A is supposed to be infinitely small ($\Delta r \to 0$), the contour and area integrals in equation (8) can be approximated with an arbitrary precision as follows:

$$\oint_C E_k \cdot dr = \Delta r \cdot \{[E_k(r)]_R - [E_k(r)]_L\},$$

$$\oint_C G_k \cdot dh = \int_{h_L(r)}^{h_R(r)} [G_k(h,r) - G_k(h, r+\Delta r)] \cdot dh =$$

$$-\Delta r \cdot \int_{h_L(r)}^{h_R(r)} \left[\frac{\partial G_k(r)}{\partial r}\right] \cdot dh = -\Delta r D \left[\frac{\partial G_k(r)}{\partial r}\right]_{avr},$$

$$\iint_A S_k \cdot dr \cdot dr = \Delta r \cdot S_k(h,r) \cdot dh = \Delta r D [S_k(r)]_{avr},$$

where $D=D(r)=h_R(r)-h_L(r)$ is local thickness of disk actuator, index "avr" means respective average values on the segment $h_L(r) \le h \le h_R(r)$, and indices "L" and "R" denote flow parameter at the "left" and "right" points (h, r) closely adjoining upstream and downstream sides of actuator, respectively, as indicated in FIG. 2. After substituting approximations above in equation (8), the latter reduces to $$[E_k(r)]_R - [E_k(r)]_L = D[S_k(r) - \partial G_k(r)/\partial r]_{avr}. \quad (9)$$

Equation (9) can now be directly used for deriving jump conditions for flow parameters.

Since left and right bounds of A are located in free stream areas, i.e. outside of boundary layers, contribution of dissipative terms to the axial fluxes $[E_k(r)]_R$ and $[E_k(r)]_L$ is negligibly small at high Reynolds numbers, see note 1 above. On the other hand, impact of the dissipative effects on the average values $[S_k(r)]_{avr}$ and $[\partial G_k(r)/\partial r]_{avr}$ inside swept areas of blade wheels can be significant, but when applying disk actuator model, it is assumed that all such effects are represented by properly defined "effective" drag and lift coefficients $C_D$ and $C_L$ of blade elements defining source terms $f_h$, $f_r$, $f_\phi$, and e in (3), see equations 28-49 below. Therefore, explicitly including dissipative terms in expressions for $E_k$, $G_k$ and $S_k$ is not necessary.

For evaluating accuracy of approximate formulas the standard "big O" notation will be used below. Relationship $a=O(b)$ between two physical values a and b should be interpreted as "a has the same order of magnitude as b, or less", so that ratio |a/b| is always finite. Also, two dimensionless parameters will be used:

$$\epsilon = u_r/u_h, \quad \delta = D/r. \quad (10)$$

which may be small or finite depending on a particular flow pattern and considered point of flow field. As long as all previous considerations were made in terms of dimensional variables, dimensional velocity scale $u\infty$ and density scale $\rho_\infty$ are also required for comparing orders of magnitudes of physical values. For example, when analyzing an open wind or hydro turbine, velocity and density of the far upstream flow can be accepted as such scales. Generally, it is supposed that scales $u\infty$, $\rho\infty$ are selected so that $$u_h = u_\infty \cdot O(1), \quad \rho = \rho_\infty \cdot O(1) \quad (11)$$

everywhere inside swept volume of a blade wheel. Relationship (12) results in the following initial evaluations:

$$u_r = u_\infty \cdot O(\epsilon), \quad u_\phi = u_\infty \cdot O(1),$$

$$\Delta p = \rho_\infty u_\infty^2 \cdot O(1), \quad \Delta H = u_\infty^2 \cdot O(1). \quad (12)$$

In flows of an incompressible fluid static pressure p is defined with accuracy of an arbitrary spatially constant additive function $p_0(t)$, so that grad $[p(t,x,y,z)+p_0(t)]=$grad $p(t,x,y,z)$. In such cases only spatial variations of pressure $\Delta p$, or grad(p) make physical sense, but not its absolute values.

For k=1 scalar components of vectors (3) are $$E_1 = r\rho u_h, \quad G_1 = r\rho u_r, \quad S_1 = 0.$$

So, the 1st of averaged equations (9) reflecting mass balance across disk actuator is $$r[(\rho u_h)_R - (\rho u_h)_L] = -D[\partial(r\rho u_r)/\partial r]_{avr}.$$

As long as $\partial(r\rho u_r)/\partial r = \rho_\infty u_\infty \cdot O(\epsilon)$, this finally results in estimation $$(\rho u_h)_R - (\rho u_h)_L = \rho_\infty u_\infty \cdot O(\epsilon \cdot \delta). \quad (13)$$

In case of incompressible fluid $\rho = \rho_\infty = $const and estimation (13) reduces to $$(u_h)_R - (u_h)_L = u_\infty \cdot O(\epsilon \cdot \delta). \quad (14)$$

For k=2 scalar components of vectors (3) are $$E_2 = r(\rho u_h^2 + p), \quad G_2 = r\rho u_h u_r, \quad S_2 = rf_h,$$

where dissipative terms $(E_v)_2$, $(G_v)_2$, and $(S_v)_2$ are omitted in accordance with note 3 above. So, the 2nd of averaged equations (9) reflecting h-momentum balance across disk actuator is $$r[(\rho u_h^2 + p)_R - (\rho u_h^2 + p)_L] = D[rf_h - \partial(r\rho u_h u_r)/\partial r]_{avr}.$$

As long as $\partial(r\rho u_h u_r)/\partial r = \rho_\infty u_\infty^2 \cdot O(\epsilon)$, this finally results in estimation $$(\rho u_h^2 + p)_R - (\rho u_h^2 + p)_L = D \cdot (f_h)_{avr} + \rho_\infty u_\infty^2 \cdot O(\epsilon \cdot \delta),$$

and taking into account (13), $$(u_h)_R - (u_h)_L + (p_R - p_L)/(\rho u_h) = D \cdot (f_h)_{avr}/(\rho u_h) + u_\infty \cdot O(\epsilon \cdot \delta), \quad (15)$$

In case of incompressible fluid combination of estimations (14) and (15) yields $$p_R - p_L = D \cdot (f_h)_{avr} + \rho_\infty u_\infty^2 \cdot O(\epsilon \cdot \delta). \quad (16)$$

Note that average volume density of axial forces $(f_h)_{avr}$ in (15) and (16) may not be finite, since for a finite total impact of disk actuator on h-momentum balance $D \cdot (f_h)_{avr} = O(1)$, hence $|(f_h)_{avr}| \to \infty$ at $D \to 0$.

For k=3 scalar components of vectors (3) are $$E_3 = r\rho u_h u_r, \quad G_3 = r(\rho u_r^2 + p), \quad S_3 = p + \rho u_\phi^2 + rf_r,$$

where dissipative terms $(E_v)_3$, $(G_v)_3$, and $(S_v)_3$ are omitted in accordance with note 3 above. So, the 3rd of averaged equations (9) reflecting r-momentum balance across disk actuator is $$r[(\rho u_h u_r)_R - (\rho u_h u_r)_L] = D\left\{p + \rho u_\varphi^2 + rf_r - \frac{\partial[r(\rho u_r^2 + p)]}{\partial r}\right\}_{avr} =$$
$$= D\left[\rho u_\varphi^2 + rf_r - r \cdot \frac{\partial p}{\partial r} - \frac{\partial(r\rho u_r^2)}{\partial r}\right]_{avr},$$

and after dividing by r we get $$(\rho u_h u_r)_R - (\rho u_h u_r)_L = \delta[\rho u_\varphi^2 + rf_r - r\cdot\partial p/\partial r - \partial(r\rho u_r^2)/\partial r]_{avr}. \quad (17)$$

As long average volume density of radial forces $(f_r)_{avr}$ is less then $(f_h)_{avr}$ and $(f\varphi)_{avr}$ by its order of magnitude, and an infinitely thin blade wheel should provide zero impact on r-momentum of the flow, i.e. $D\cdot(f_h)_{avr}\rightarrow 0$ when $D\rightarrow 0$, it would be reasonable to assume that $(f_r)_{avr}$ remains finite independently of D, i.e. $(f_r)_{avr}=O(1)$. If this assumption is valid, then the right hand side term in square brackets is finite as well:

$$[\rho u_\varphi^2 + rf_r - r\cdot\partial p/\partial r - \partial(r\rho u_r^2)/\partial r]_{avr} = O(1)$$

everywhere in the area of integration A, and equation (17) immediately results in estimation $$(\rho u_h u_r)_R - (\rho u_h u_r)_L = \rho_\infty u_\infty^2 \cdot O(\delta). \quad (18)$$

On the other hand, $u_r = u_\infty \cdot O(\epsilon)$ by definition (10) of parameter $\epsilon$, so that $$(\rho u_h u_r)_R - (\rho u_h u_r)_L = \rho_\infty u_\infty^2 \cdot O(\epsilon\cdot\delta). \quad (19)$$

Combination of (18) and (19) yields $$(\rho u_h u_r)_R - (\rho u_h u_r)_L = \rho_\infty u_\infty^2 \cdot O(\epsilon\cdot\delta),$$

and taking into account jump condition (13), we finally get $$(u_r)_R - (u_r)_L = u_\infty \cdot O(\epsilon\cdot\delta), \quad (20)$$

for both compressible and incompressible fluids.
For k=4 scalar components of vectors (3) are $$E_4 = r^2 \rho u_h u_\varphi, \quad G_4 = r^2 \rho u_r u_\varphi, \quad S_4 = r^2 f_\varphi,$$

where dissipative terms $(E_v)_4$, $(G_v)_4$, and $(S_v)_4$ are omitted in accordance with note 3 above. So, the 4th of averaged equations (9) reflecting $\varphi$-momentum balance across disk actuator is $$r^2[(\rho u_h u_\varphi)_R - (\rho u_h u_\varphi)_L] = D[r^2 f_\varphi - \partial(r^2 \rho u_r u_\varphi)/\partial r]_{avr}.$$

As long as $[\partial(r^2 \rho u_r u_\varphi)/\partial r]_{avr} = r\rho_\infty u_\infty^2 \cdot O(\epsilon)$, this results in estimation $$(\rho u_h u_\varphi)_R - (\rho u_h u_\varphi)_L = D\cdot(f_\varphi)_{avr} + \rho_\infty u_\infty^2 \cdot O(\epsilon\cdot\delta),$$

and taking into account jump condition (13), we finally get $$(u_\varphi)_R - (u_\varphi)_L = D\cdot(f_\varphi)_{avr}/(\rho u_h) + u_\infty \cdot O(\epsilon\cdot\delta) \quad (21)$$

for both compressible and incompressible fluids. Note that average volume density of azimuth forces $(f_\varphi)_{avr}$ in (21) may not be finite, since for a finite total impact of disk actuator on $\varphi$-momentum balance $D\cdot(f_\varphi)_{avr}=O(1)$, hence $|(f_\varphi)_{avr}|\rightarrow\infty$ at $D\rightarrow 0$.

For k=5 scalar components of vectors (3) are $$E_5 = r\rho u_h H^{(*)}, \quad G_5 = r\rho u_r H^{(*)}, \quad S_5 = re,$$

where dissipative terms $(E_v)_5$, $(G_v)_5$, and $(S_v)_5$ are omitted in accordance with note 3 above. So, the 5th of averaged equations (9) reflecting energy balance across disk actuator is $$r[(\rho u_h H^{(*)})_R - (\rho u_h H^{(*)})_L] = D[re - \partial(r\rho u_r H^{(*)})/\partial r]_{avr}.$$

As long as $\partial(r\rho u_r H^{(*)})/\partial r = \rho_\infty u_\infty^3 \cdot O(\epsilon)$, this results in estimation $$(\rho u_h H^{(*)})_R - (\rho u_h H^{(*)})_L = D\cdot e_{avr} + \rho_\infty u_\infty^3 \cdot O(\epsilon\cdot\delta),$$

and taking into account jump condition (13), we finally get $$H^{(*)}_R - H^{(*)}_L = D\cdot e_{avr}/(\rho u_h) + u_\infty^2 \cdot O(\epsilon\cdot\delta) \quad (22)$$

for both compressible and incompressible fluids. Note that average volume density of energy sources $e_{avr}$ in (22) may not be finite, since for a finite total impact of disk actuator on energy balance $D\cdot e_{avr}=O(1)$, hence $|e_{avr}|\rightarrow\infty$ at $D\rightarrow 0$.

Figure 3:
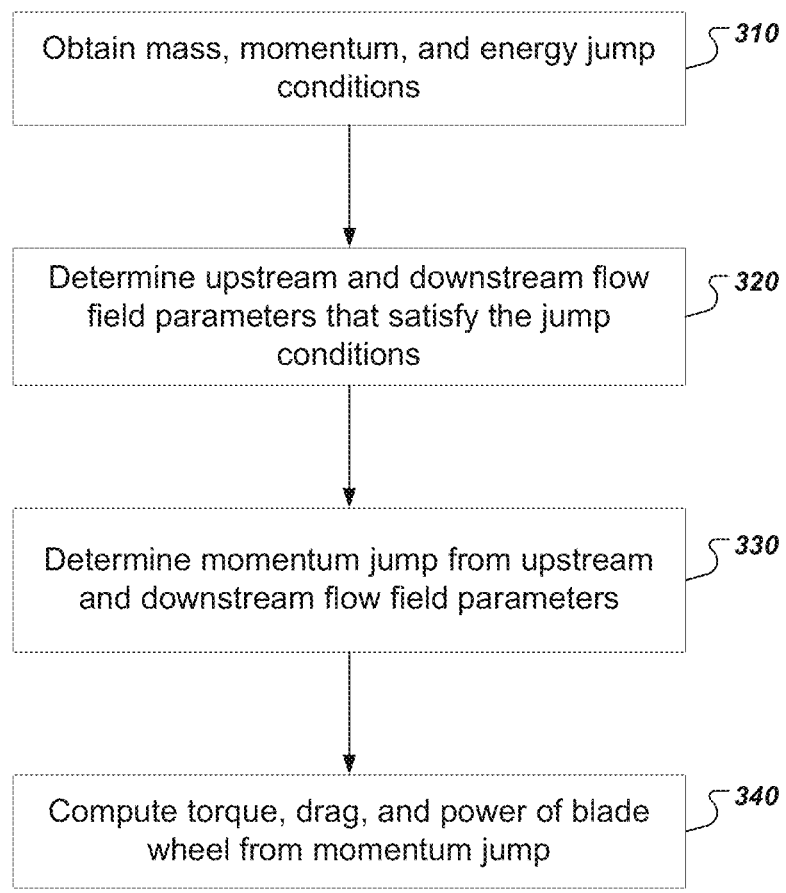
FIG. 3 is a flow chart of an example process for computing torque, drag, and power using jump conditions.

FIG. 3 is a flow chart of an example process for computing torque, drag, and power using jump conditions. The process will be described as being performed by an appropriately programmed system of one or more computers.

The system obtains mass, momentum, and energy jump conditions (310). After summarizing estimations (13), (15), (20), (21), and (22), we can conclude that the approximate jump conditions connecting flow parameters on the upstream and downstream sides of disk actuator $$\begin{cases} (\rho u_h)_R = (\rho u_h)_L, & (23) \\ (u_H)_R - (u_h)_L + (p_R - p_L)/(\rho u_h) = D\cdot(f_h)_{avr}/(\rho u_h), & (24) \\ (u_r)_R = (u_r)_L, & (25) \\ (u_\varphi)_R - (u_\varphi)_L = D\cdot(f_\varphi)_{avr}/(\rho u_h), & (26) \\ H^{(*)}_R - H^{(*)}_L = D\cdot e_{avr}/(\rho u_h) & (27) \end{cases}$$

are all valid with relative accuracy $O(\epsilon\cdot\delta)$. Therefore, fidelity of the model is determined by the dimensionless scale factor $(\epsilon\cdot\delta)$, rather than scale of radial velocity $\epsilon$, i.e. initial assumption furl uh, is not required. Instead, the assumption $(\epsilon\cdot\delta)\ll 1$ should be used as a fidelity criterion, which is satisfied for virtually all practical cases.

In fact, in all axial-flow turbo machines root parts of blades (large $\delta=D/r$) do not create significant impact on momentum and energy of the flow because of their small swept areas, tangential speed, and arm length of applied hydrodynamic loads. On the other hand, middle and tip parts of blades (small $\delta=D/r$), producing major contribution to momentum and energy re-distribution, satisfy to the condition $(\epsilon\cdot\delta)\ll 1$, especially as their pitch angles are typically close to 90°.

The average h- and $\varphi$-momentum sources $(f_h)_{avr}$, $(f_\varphi)_{avr}$ in right hand sides of jump conditions (24), (26) can be evaluated it terms hydrodynamic properties of 2D blade sections using classical Glauert's Blade Element Momentum Model (BEM), described, for example, in dissertation [7].

For convenience of further considerations, an auxiliary Cartesian coordinate system (x, y, z) will be used below in addition to the previously introduced cylindrical coordinates (h, r, $\varphi$):

$$\begin{cases} x = h, \\ y = r\cdot\cos\varphi, \\ z = r\cdot\sin\varphi. \end{cases} \quad (28)$$

Cartesian components of flow velocity u, v, w, in respective directions x, y, z can be expressed in terms of $u_h$, $u_r$, $u_\varphi$ as $$\begin{cases} u = u_h \\ v = u_r \cdot \cos\varphi - u_\varphi \cdot \sin\varphi \\ w = u_r \cdot \sin\varphi + u_\varphi \cdot \cos\varphi \end{cases} \quad (29)$$

Figure 4:
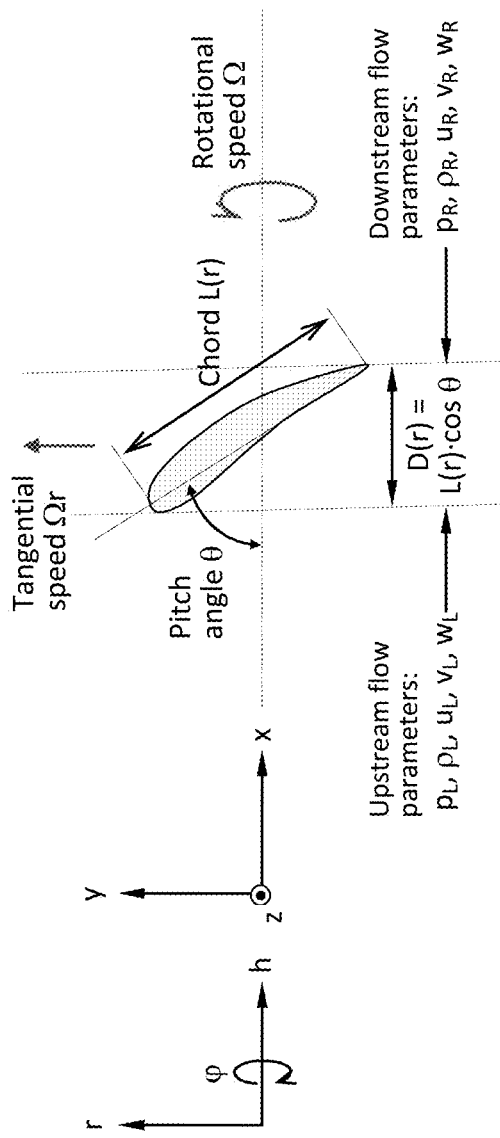
FIG. 4 illustrates the cross-sectional blade element at radius r and $\phi = \pi/2$.

Let's now consider an infinitely thin blade element formed by intersection of blade with a cylinder of given radius r. Such element located in azimuth position $\phi=\pi/2$ is shown in FIG. 4, where all upstream and downstream flow parameters, as well as blade section geometry, depend on radius r. Note that $u=u_h$, $v=-u_\phi$, and $w=u_r$ at $\phi=\pi/2$.

In the coordinate system rotating with a constant speed $\Omega$, where $\Omega$ is rotational speed of the blade wheel, Cartesian velocity components are $(u, v-\Omega r, w)$. Let's introduce additional local Cartesian coordinates (x', y') rotated by angle $\beta_{avr}$ with respect to initial coordinates (x, y) in tangential plane of the blade element:

$$\begin{aligned} x' &= x\cos\beta_{avr} + y\sin\beta_{avr}, \\ y' &= -x\sin\beta_{avr} + y\cos\beta_{avr}, \\ x &= x'\cos\beta_{avr} - y'\sin\beta_{avr}, \\ y &= x'\sin\beta_{avr} + y'\cos\beta_{avr}, \end{aligned} \quad (30)$$

where $$\begin{aligned} \beta_{avr} &= \operatorname{atan}[(v - \Omega r)_{avr}/u_{avr}] = \\ &= -\operatorname{atan}\left\{\frac{[(u_\varphi)_L + (u_\varphi)_R + 2\Omega r]}{[(u_h)_L + (u_h)_R]}\right\} \end{aligned} \quad (31)$$

characterizes an averaged direction of flow velocity in rotating coordinate system. Formula (31) is specifically constructed to provide such direction of total hydrodynamic load applied to the blade element that for an ideal hydrofoil having zero drag, amount of power withdrawn by the element is exactly zero in rotating coordinate system, i.e. there is no dissipative energy losses. If the blade element produces positive output power then $\Omega r > |v_L|$, so that $\beta_{avr} < 0$.

Components of hydrodynamic load applied to the blade element in the coordinate system (x', y') are $$\Delta X' = [(\rho U^2)_{avr}/2]C_D L \cdot \Delta r = qC_D L \cdot \Delta r,$$

$$\Delta Y' = [(\rho U^2)_{avr}/2]C_L L \cdot \Delta r = qC_L L \cdot \Delta r, \quad (32)$$

where $\Delta r$ is radial thickness of the element ($\Delta r \to 0$), $L=L(r)$ is its chord, $C_D=C_D(\alpha, r)$, $C_L=C_L(\alpha, r)$ are its drag and lift coefficients, respectively, and $\alpha=\theta(r)+\beta_{avr}(r)$ is its angle of attack in the local coordinate system (x', y'). The average dynamic pressure $q=(\rho U^2)_{avr}/2$ in (32) is defined as $$\begin{aligned} q &= (\rho U^2)_{avr}/2 \quad (33) \\ &= \frac{\{\rho[u^2 + (v - \Omega r)^2]\}_{avr}}{2} = \\ &= \frac{\left\{\begin{array}{l}\rho_L[(u_h)_L^2 + (u_\varphi + \Omega r)_L^2] + \\ \rho_R[(u_h)_R^2 + (u_\varphi + \Omega r)_R^2 + (u_\varphi + \Omega r)_R^2]\end{array}\right\}}{4}. \end{aligned}$$

Radial velocity $u_r$ is not included in right hand side of expression (33) as its contribution to hydrodynamic loads is supposed to be negligible, see equation 17.

Components of hydrodynamic load applied to the blade element in the initial coordinate system (x, y) are $$\Delta X = \Delta X' \cos\beta_{avr} - \Delta Y' \sin\beta_{avr} = q(C_D \cos\beta_{avr} - C_L \sin\beta_{avr})L \cdot \Delta r, \quad (34)$$

$$\Delta Y = \Delta X' \sin\beta_{avr} + \Delta Y' \cos\beta_{avr} = q(C_D \sin\beta_{avr} + C_L \cos\beta_{avr})L \cdot \Delta r. \quad (35)$$

Drag, torque, and mechanical power produced by the blade element are: $\Delta X$, $r \cdot \Delta Y$, and $\Omega r \cdot \Delta Y$, respectively, so that their total values can be computed via integration from $r=r_{min}$ to $r=r_{max}$, and multiplication resulting integrals by number of blades.

For the considered blade element above, averaged values $(f_h)_{avr}$, $(f_\varphi)_{avr}$ from (24,26) can be evaluated from the forces (34,35) as follows:

$$(f_h)_{avr} = -\Delta X/\Delta V = -\Delta X/(2\pi r D \cdot \Delta r/N), \quad (36)$$

$$(f_\varphi)_{avr} = \Delta Y/\Delta V = \Delta Y/(2\pi r D \cdot \Delta r/N), \quad (37)$$

where N is number of impeller blades, so that each element of each separate blade provides momentum input in the azimuth range $2\pi/N$, so respective elementary swept volume is $\Delta V = 2\pi r D \cdot \Delta r/N$. As long as $(f_h)_{avr}$, $(f_\varphi)_{avr}$ in (24), (26) represent flow reaction to the hydrodynamic loads applied to the blade element, they should be assigned opposite signs. That is why in formula (36) sign "−" is set for $\Delta X$ (as x- and h-directions coincide, $\partial x/\partial h > 0$), while in formula (37) sign "+" is set for $\Delta Y$ (as y- and $\phi$-directions are opposite, $\partial y/\partial \phi < 0$ at $\phi=\pi/2$). Substitution of expressions (36), (37) in jump conditions (24), (26), respectively, and use of relationships (34), (35) for evaluating ratios $\Delta X/\Delta r$, $\Delta Y/\Delta r$, results in representation of h- and (p-momentum jumps in terms of $C_D$ and $C_L$:

$$\begin{aligned} \rho u_h[(u_h)_R - (u_h)_L] + (p_R - p_L) &= -(\Delta X/\Delta r)N/(2\pi r) = \\ &= -q\left(\frac{C_D\cos\beta_{avr} -}{C_L\sin\beta_{avr}}\right)LN/(2\pi r) \\ &= q\sigma(C_L\sin\beta_{avr} - C_D\cos\beta_{avr}), \end{aligned} \quad (38)$$

$$\begin{aligned} \rho u_h[(u_\varphi)_R - (u_\varphi)_L] &= (\Delta Y/\Delta r)N/(2\pi r) = \\ &= q(C_D\sin\beta_{avr} + C_L\cos\beta_{avr})LN/(2\pi r) \\ &= q\sigma(C_D\sin\beta_{avr} + C_L\cos\beta_{avr}), \end{aligned} \quad (39)$$

where $\sigma=\sigma(r)=LN/(2\pi r)$ is solidity factor of blade wheel.

The system determines the upstream flow field parameters and the downstream flow field parameters that satisfy the jump conditions (320), for example, by using a computational fluid dynamics software package. The system determines momentum jump values from the upstream flow field parameters and the downstream flow field parameters (330).

The system computes the drag, torque, and power produced by the blade wheel from the momentum jumps (340). Drag $\Delta X$, torque $\Delta M$ and mechanical power $\Delta W$ produced by N blade elements are $$N \cdot \Delta X = -2\pi r\{\rho u_h[(u_h)_R - (u_h)_L] + (p_R - p_L)\} \cdot \Delta r,$$

$$N \cdot \Delta M = 2\pi r^2 \rho u_h[(u_\varphi)_R - (u_\varphi)_L] \cdot \Delta r,$$

$$N \cdot \Delta W = \Omega N \cdot \Delta M, \quad (40)$$

and total drag X, torque M, and mechanical power W from the energy and produced by the blade wheel are $$X = -2\pi \int_{r_{min}}^{r_{max}} r\{\rho u_h[(u_h)_R - (u_h)_L] + (p_R - p_L)\} \cdot dr, \quad (41)$$

$$M = 2\pi \int_{r_{min}}^{r_{max}} r^2 \rho u_h[(u_\varphi)_R - (u_\varphi)_L] \cdot dr,$$

$$W = \Omega \cdot M,$$

where the integrand expressions are represented by (38) and (39).

Relationships (23), (25), (38), and (39) constitute a complete set of jump conditions for equations of continuity and momentums. Jump condition (27) for energy equation should be considered separately for the cases of incompressible and compressible fluid because of distinction of their physical meanings and different interpretations of total specific enthalpy H(*), see note 2 above.

If the energy equation, i.e. equation (7) for k=5, is written without taking into account internal (thermal) fluid energy, it describes distribution of total specific enthalpy (4) representing only potential (p/ρ) and kinetic ($u^2/2$) energies per unit mass. Such form of energy equation can be derived as a combination of all remaining equations, so that density of energy sources e in (3) can be expressed in terms of momentum sources $f_h$ and $f_\varphi$. In this case jump of enthalpy (4) can be expressed in terms of pressure and velocity components, without using condition (27), as follows:

$$H_R^* - H_L^* = [p/\rho + (u_h^2 + u_r^2 + u_\varphi^2)/2]_R - \qquad (42)$$
$$[p/\rho + (u_h^2 + u_r^2 + u_\varphi^2)/2]_L =$$
$$= (p_R - p_L)/\rho + [(u_\varphi)_R^2 - (u_\varphi)_L^2]/2$$

using previously computed p and $u_\varphi$, and taking into account that $(u_r)_R=(u_r)_L$ and $(u_h)_R=(u_h)_L$ at constant ρ, see (23), (25). So, mechanical power contributed to the flow by N blade elements located at radius r equals $$N \cdot \Delta P^* = 2\pi r \rho u_h (H_R^* - H_L^*) \cdot \Delta r, \qquad (43)$$

and total mechanical power P* contributed by the blade wheel is $$P^* = 2\pi \int_{r_{min}}^{r_{max}} r\rho u_h (H_R^* - H_L^*) \cdot dr. \qquad (44)$$

Note that generally W≠−P* (see (41)), because the latter includes part of mechanical power dissipated into heat due to viscous friction.

Let's consider an ideal blade element having zero drag ($C_D=0$), and suppose that input flow is irrotational ($(u_\varphi)_L=0$). In this case jump conditions (38), (39) reduce to $$p_R - p_L = q\sigma C_L \sin\beta_{avr}, \qquad (45)$$
$$(u_\varphi)_R = q\sigma C_L \cos\beta_{avr}/(\rho u_h),$$

hence $$p_R - p_L = \rho u_h (u_\varphi)_R \tan(\beta_{avr}) =$$
$$-\rho(u_\varphi)_R[(u_\varphi)_R + 2\Omega r]/2 == -\rho r^2 \omega(\omega/2 + \Omega),$$

where tan ($\beta_{avr}$) is evaluated using expression (31) at $(u_h)_L=(u_h)_R=u_h$, and rotational speed $\omega_\varphi=(u_\varphi)_R/r$ is introduced. Note that relationship (45) exactly coincides with the classical Glauert's estimation of pressure jump across disk actuator. In the considered idealized case relationship (42) reduces to $$H_R^* - H_L^* = (p_R - p_L)/\rho + r^2\omega^2/2 = -r^2\omega\Omega,$$

thus resulting in $N \cdot \Delta W = \Omega \cdot 2\pi r^2 \rho_h[(u_\varphi)_R - (u_\varphi)_L] \cdot \Delta r = 2\pi r^3 \rho u_h \omega \Omega \cdot \Delta r,$ and $N \cdot \Delta P^* = -2\pi r^3 \rho u_h \omega \Omega \cdot \Delta r = -N \cdot \Delta W,$ see (40) and (43). Therefore, W=−P* in the absence of dissipative losses ($C_D=0$).

When practically evaluating efficiency of open wind and water turbines, the impact of blade tip vortex structures on momentum and energy balances should also be taken into account. Contribution of the tip vortices in impeller wake to drag X and power P* of the turbine can be evaluated using one of standard tip correction techniques, which are minutely described in the publications specifically dedicated to practical implementations of disk actuator models, see for example [7].

If energy equation, i.e. equation (7) for k=5, is written with taking into account internal (thermal) fluid energy, it describes distribution of total specific enthalpy (5) or (6) representing full energy of the fluid per unit mass. In this case density of energy sources e in (3) includes both power produced by momentum sources $f_h$, $f_\varphi$, and heat fluxes arising from non-zero gradients of temperature in a thermally conductive media, so that jump condition (27) reflects full amount of power contributed to the flow. However, instead of directly evaluating energy source e and using condition (27), it is more convenient to derive an independent relationship of energy balance.

Jump of enthalpy (5) can be expressed in term of velocity components and other flow parameters, as follows:

$$H_R - H_L = [E_{int} + p/\rho + (u_h^2 + u_r^2 + u_\varphi^2)/2]_R - \qquad (46)$$
$$[E_{int} + p/\rho + (u_h^2 + u_r^2 + u_\varphi^2)/2]_L$$
$$= [E_{int} + p/\rho + (u_h^2 + u_\varphi^2)/2]_R -$$
$$[E_{int} + p/\rho + (u_h^2 + u_\varphi^2)/2]_L.$$

taking into account that $(u_r)_R=(u_r)_L$, see (25). So, full power contributed to the flow by N blade elements located at radius r equals $$N \cdot \Delta P = 2\pi r \rho u_h (H_R - H_L) \cdot \Delta r. \qquad (47)$$

Although relationship (47) has the same form as (43), it includes full power P instead mechanical power P*, and uses another definition of specific enthalpy H.

Let's suppose that rate of heat transfer between gas and turbine blades is much less than total energy flux through the blade wheel and output mechanical power (if any). If this assumption is valid, then full power withdrawn from the flow −ΔP should be spent for producing output mechanical power ΔW, i.e.

$$\Delta P + \Delta W = 0. \qquad (48)$$

Substitution of expressions for ΔW (40) and ΔP (47) in equation (48) finally results in the following independent relationship representing energy jump condition:

$$(H_R - H_L) + r\Omega[(u_\varphi)_R - (u_\varphi)_L] = 0, \qquad (49)$$

where the difference ($H_R - H_L$) is defined by formula (46). Relationship (49) in combination with a given equation of state p=ρ(p, T) and expression for internal energy $E_{int}=E_{int}$(p, T) provides mathematical closure of the problem.

Figure 5:
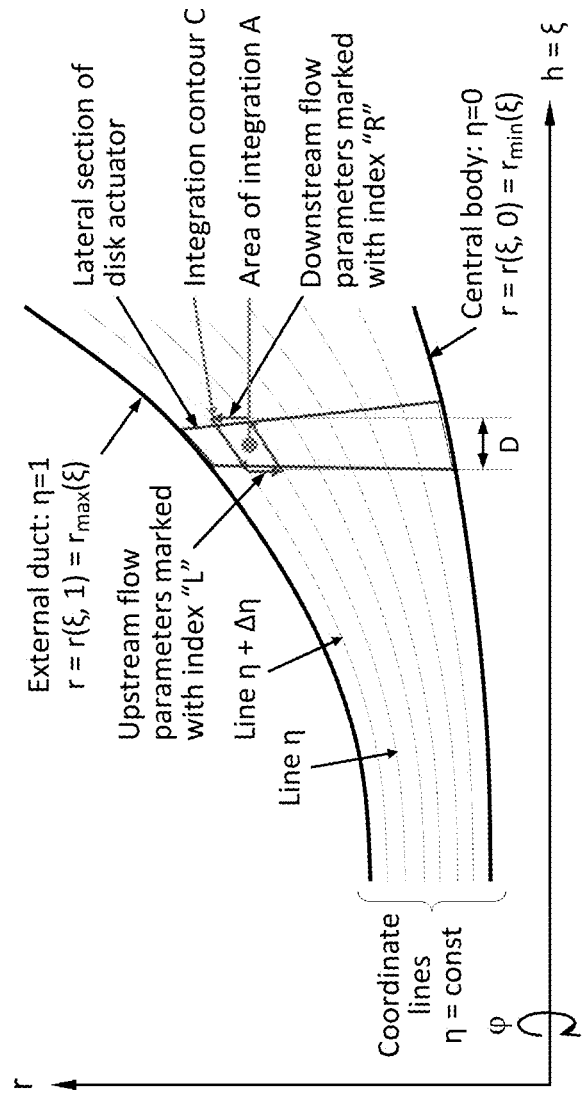
FIG. 5 illustrates a transformed integration area and contour in a lateral section of disk actuator.

Numerical modeling some types of turbo machines does not allow efficiently using the cylindrical coordinate system (h, r, φ) introduced above. Let's consider, for example a wide angle ducted turbo machine schematically shown in FIG. 5.

In such a machine flow area is bounded by two rigid surfaces, central body and external duct, so that in case of steady state and axially symmetric flow field total mass flux is the same in all cross sections h=const. Hence, an average axial flow velocity varies along the turbine depending on local area of its cross section.

In the suggested disk actuator model jump condition (23) derived in cylindrical coordinates provides conservation of mass flux if and only if radial positions of the left and right bounds of integration area A are exactly equal. Therefore, the model generally does not preserve mass conservation in case of variable cross section area because of violation of mass balance at finite thickness of disk actuator D(r). In this case the cylindrical coordinate system (h, r, φ) is not convenient for properly constructing disk actuator model, and a transformed coordinate system should be used instead.

Let's introduce an auxiliary curvilinear coordinate system (ξ, η) in a lateral section φ=const, so that the inner and outer bounds of flow field coincide with some coordinate lines η=const. If geometrical shapes of the central body and external duct are described by given functions $r=r_{min}(h)$ and $r=r_{max}(h)$, respectively, as shown in FIG. 4, then required coordinate transformation (ξ, η)→(h, r) can be defined as $$\begin{cases} h(\xi, \eta) = \xi, \\ r(\xi, \eta) = r_{min}(\xi) + \eta \cdot [r_{max}(\xi) - r_{min}(\xi)], \end{cases} \quad (50)$$

and $r(\xi, 0)=r_{min}(\xi)$, $r(\xi, 1)=r_{max}(\xi)$. Navier-Stokes equations (2) describing steady state axially symmetric flow take the following form in coordinates (ξ, η):

$$\frac{\partial (E^* - E^*_v)}{\partial \xi} + \frac{\partial (G^* - G^*_v)}{\partial \eta} = S^* - S^*_v. \quad (51)$$

Transformed flux and source vectors in equations (51) are expressed in terms respective vectors in equations (2) as $E^*_{(v)} = [(\partial \xi / \partial h) E_{(v)} + (\partial \xi / \partial r) G_{(v)}] \cdot \det(J),$ $G^*_{(v)} = [(\partial \eta / \partial h) E_{(v)} + (\partial \eta / \partial r) G_{(v)}] \cdot \det(J),$ $S^*_{(v)} = S_{(v)} \cdot \det(J), \quad (52)$ where J is Jacobian matrix of the coordinate transformation (ξ, η)→(h, r)

$$J = \frac{\partial(r, h)}{\partial(\xi, \eta)} = \begin{Vmatrix} \partial h/\partial \xi & \partial h/\partial \eta \\ \partial r/\partial \xi & \partial r/\partial \eta \end{Vmatrix},$$

$$J^{-1} = \frac{\partial(\xi, \eta)}{\partial(r, h)} = \begin{Vmatrix} \partial \xi/\partial h & \partial \xi/\partial r \\ \partial \eta/\partial h & \partial \eta/\partial r \end{Vmatrix}$$

For transformation (50) $\partial h/\partial \xi = 1$, $\partial h/\partial \eta = 0$, $$J = \begin{Vmatrix} 1 & 0 \\ r'_\xi & r'_\eta \end{Vmatrix}, \quad (53)$$

$\det(J) = r'_\eta,$ $$J^{-1} = \begin{Vmatrix} 1 & 0 \\ -r'_\xi/r'_\eta & 1/r'_\eta \end{Vmatrix}$$

where brief notations for the derivatives $r'_\xi = \partial r/\partial \xi$ and $r'_\eta = \partial r/\partial \eta$ are introduced. After substitution of metric coefficients (53) in expressions (52) the latter reduce to $E^*_{(v)} = r'_\eta E_{(v)}$, $G^*_{(v)} = G_{(v)} - r'_\xi E_{(v)}$, $S^*_{(v)} = r'_\eta S_{(v)}$, (54)

and component-wise representations of the transformed flux and source vectors are $$E^* = \begin{Vmatrix} rr'_\eta \rho u_h \\ rr'_\eta (\rho u_h^2 + p) \\ rr'_\eta \rho u_h u_r \\ r^2 r'_\eta \rho u_h u_\varphi \\ rr'_\eta \rho u_h H^{(*)} \end{Vmatrix}, \quad (55)$$

$$G^* = \begin{Vmatrix} r\rho(u_r - u_h r'_\xi) \\ r[\rho u_h(u_r - u_h r'_\xi) - pr'_\xi] \\ r[\rho u_r(u_r - u_h r'_\xi) + p] \\ r^2 \rho u_\varphi(u_r - u_h r'_\xi) \\ r\rho H^{(*)}(u_r - u_h r'_\xi) \end{Vmatrix},$$

$$S^* = \begin{Vmatrix} 0 \\ rr'_\eta f_h \\ r'_\eta(p + \rho u_\varphi^2 + rf_r) \\ r^2 r'_\eta f_\varphi \\ rr' e \end{Vmatrix}$$

Let's select an infinitely narrow integration area A in plane (ξ, η), so that its lower and upper bounds cross lateral section of disk actuator and are located on coordinate lines η and η+Δη, respectively, while its left ($\xi=\xi_L(\eta)$) and right ($\xi=\xi_R(\eta)$) bounds are located in the areas of free stream closely adjoining left and right sides of the disk, see FIG. 4. Similarly to our previous considerations, flow parameters and metric coefficients at the left and right bounds of the area A will are marked with the indices "L" and "R", respectively. As long as area A is distorted in cylindrical coordinate system (h, r), radial positions of its left and right bounds do not coincide ($r_L \neq r_R$ at Δη→0) if disk actuator of a finite thickness D(η)≠0 is used for modeling.

Vector equation (51) can be re-written in the scalar form $(\partial E^*_k/\partial \xi)+(\partial G^*_k/\partial \eta)=S^*_k.$ (56)

Integration of equations (56) over area A, application of the 1-st Green's integral formula, and representation of respective integrals in terms of average values (see above), result in averaged equations $[E^*_k(\eta)]_R - [E^*_k(\eta)]_L = D[S^*_k(\eta) - \partial G^*_k(\eta)/\partial \eta]_{avr},$ (57)

which are quite similar to equations (9). Jump conditions for flow parameters can be directly derived from equations (57) can in exactly the same way as above:

$$\begin{cases} (rr'_\eta \rho u_h)_R = (rr'_\eta \rho u_h)_L, & (58) \\ (u_h)_R - (u_h)_L + (p_R - p_L)(rr'_\eta)_{avr}/(rr'_\eta \rho u_h) = D \cdot (rr'_\eta f_h)_{avr}/(rr'_\eta \rho u_h), & (59) \\ (u_r)_R = (u_r)_L, & (60) \\ (ru_\varphi)_R - (ru_\varphi)_L = D \cdot (r^2 r'_\eta f_\varphi)_{avr}/(rr'_\eta \rho u_h), & (61) \\ H_R^{(*)} - H_L^{(*)} = D \cdot (rr'_\eta e)_{avr}/(rr'_\eta \rho u_h). & (62) \end{cases}$$

It can be shown that approximate relationships (59) and (60) are valid with relative accuracy $O(\epsilon \cdot \delta)$, while (58), (61) and (62) are valid with relative accuracy $O(\epsilon^* \cdot \delta)$, where $\epsilon^* = (u_r - u_h r'_\xi)/u_h.$ (63)

Note that magnitude of parameter $\epsilon^*$ really should be small, as long as $\epsilon^*$ characterizes angular difference between directions of streamlines and respective coordinate lines $\eta$=const. In particular, near flow bounds $u_r/u_h=r'_g$, i.e. $\epsilon^*=0$ at both $\eta=0$ and $\eta=1$. On the other hand, magnitude of parameters generally is not assumed to be small, since in this case $\epsilon=u_r/u_h=O(rr'_g/r'_\eta)=O(1)$. Hence $\epsilon^*=O(\epsilon)$, and overall relative accuracy of the model is $O(\epsilon\cdot\delta)$.

The Blade Element Momentum Theory can now be used for representing volume densities of forces $f_h$ and $f_\phi$ in terms of drag and lift coefficients $C_D$, $C_L$ of blade elements. Substitution of the previously derived expressions (34)-(37) into (59) and (61) results in the following representations of h- and $\phi$-momentum jumps:

$$[(u_h)_R - (u_h)_L](rr'_\eta \rho u_h)/(rr'_\eta)_{avr} + (p_R - p_L) = q\sigma(C_L \sin \beta_{avr} - C_D \cos \beta_{avr}), \quad (64)$$

$$[(ru_\phi)_R - (ru_\phi)_L](rr'_\eta \rho u_h)/(r^2 r'_\eta)_{avr} = q\sigma(C_D \sin \beta_{avr} + C_L \cos \beta_{avr}). \quad (65)$$

Relationships (58), (60), (64), and (65) constitute a complete set of jump conditions for equations of continuity and momentums. Jump condition (62) for energy equation should be considered in accordance with the previous conclusions made in above for incompressible fluids or for compressible gases. Total drag, torque, and mechanical power produced by the blade wheel are $$X = -2\pi \int_0^1 \{[(u_h)_R - (u_h)_L](rr'_\eta \rho u_h) + (p_R - p_L)(rr'_\eta)_{avr}\} \cdot d\eta, \quad (66)$$

$$M = 2\pi \int_0^1 [(ru_\phi)_R - (ru_\phi)_L](rr'_\eta \rho u_h) \cdot d\eta,$$

$$W = \Omega \cdot M,$$

where the integrand expressions are represented by (64) and (65). Note that the product $(rr'_\eta \rho u_h)$ is specifically isolated in formulas (59), (61), (62), and (64)-(66) as $rr'_\eta \rho u_h$=const at $\eta$=const in accordance with (58). It can be seen that relationships (64), (65), and (66) are quite similar to the previously derived (38), (39), and (41), respectively.

Jump conditions (58)-(62) can be used instead of conditions (23)-(27) not only for keeping mass balance when modeling wide angle ducted turbo machines, but also in context of other similar problems, if for example, cylindrical coordinate system (h, r, $\phi$) is not convenient for some problem-specific reasons, or if accuracy of (23)-(27) is not sufficient because of a strong radial flow.

Basic conditions of applicability of the suggested model can be summarized as follows. Flow field in the area of blade wheel location can be considered as steady-state and axially symmetric, i.e. impact of unsteady and azimuth variation effects on momentum and energy balances is negligible. Scale factor ($\epsilon\cdot\delta$) is small in the regions of blade wheel swept area providing major contribution to mass, momentum, and energy balances. If a flow of compressible gas is considered, then rate of dissipative heat transfer between the gas and turbine blades is much less than total energy flux through the blade wheel and output mechanical power (if any).

The following references were mentioned above. 1. A. Betz. *Das Maximum des theoretisch möglichen Ausnützung des Windes durch Windmotoren*, Zeitschrifft für das gesamte Turbinewesen, Volume 26, p. 307, 1920. 2. H. Glauert. *Windmills and Fans*. In W. F. Durand (ed). Aerodynamic Theory. Dover Publications Inc., New York 1963. 3. J. Laursen, P. Enevoldsen, and S. Hjort. *3D CFD Quantification of the Performance of a Multi-Megawatt Wind Turbine*. The Science of Making Torque from Wind, Journal of Physics: Conference Series 75. IOP Publishing Ltd., 2007. 4. D. Hartwanger, A. Horvat. *3D Modeling of Wind Turbine Using CFD*. NAFEMS Conference 2008, United Kingdom, June 2008. 5. S. S. A. Ivanell. *Numerical Computations of Wind Turbine Wakes*. Technical Reports from Royal Institute of Technology Linnre Flow Centre, Department of Mechanics, Stockholm, Sweden, January 2009. 6. L. Battisti, G. Soraperra, R. Fedrizzi, and L. Zanne. *Inverse Design-Momentum, a Method for the Preliminary Design of Horizontal Axis Wind Turbines*. The Science of Making Torque from Wind, Journal of Physics: Conference Series 75. IOP Publishing Ltd., 2007. 7. R. Mikkelsen. *Actuator Disk Methods Applied to Wind Turbines*. Dissertation submitted to Technical University of Denmark, Fluid Mechanics, Department of Mechanical Engineering, 2003.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
obtaining a plurality of parameters of a design of a blade wheel of an axial flow turbo machine, including lift coefficients and drag coefficients for the blade wheel for each of a plurality of angles of attack $\alpha_i$ and for each of a plurality of cross sections $r_j$ of the blade wheel; from a minimum radius $r_{min}$ of the blade wheel to a maximum radius $r_{max}$ of the blade wheel;
obtaining mass jump conditions, momentum jump conditions, and energy jump conditions of a two-dimensional blade element model of the blade wheel, wherein the mass jump conditions, momentum jump conditions, and energy jump conditions each specify a relationship between upstream flow field parameters and downstream flow field parameters of the blade wheel;
computing upstream flow field parameters and downstream flow field parameters that satisfy the mass jump conditions, momentum jump conditions, and energy jump conditions of the two-dimensional blade element model;
computing momentum jump values across the swept area of the blade wheel using the computed upstream flow field parameters and the computed downstream flow field parameters that satisfy the mass jump conditions, momentum jump conditions, and energy jump conditions of the two-dimensional blade element model;
computing one or more turbine parameters for the axial flow turbo machine including computing an approximation of total torque for the design of the blade wheel by aggregating the momentum jump values across the swept area of the blade wheel; and
outputting the design of the blade wheel based on the computed one or more turbine parameters.

2. The method of claim 1, wherein computing the momentum jump values from the computed upstream flow field parameters and the computed downstream flow field parameters comprises:
computing averaged directions $\beta_i$ of velocity components of the upstream flow field parameters and the downstream flow field parameters; and
computing each momentum jump values $m_i$ according to: $m_i = q \cdot \sigma \cdot [C_D \sin \beta_i + C_L \cos \beta_i]$, where q is an average dynamic pressure, $C_D$ are drag coefficients of the blade wheel, $C_L$ are lift coefficients of the blade wheel, and wherein $\sigma$ is a solidity factor of the blade wheel.

3. The method of claim 1, wherein computing the upstream flow field parameters and the downstream flow field parameters comprises computing upstream density $\rho_L$, upstream pressure $p_L$, upstream axial velocity $(u_h)_L$, upstream azimuth velocity $(u_\varphi)_L$, downstream density $\rho_R$, downstream pressure $p_R$, downstream axial velocity $(u_h)_R$, and downstream azimuth velocity $(u_\varphi)_R$, and further comprising:
computing an approximation of total drag X produced by the blade wheel according to:

$$X = -2\pi \int_{r_{min}}^{r_{max}} r\{\rho u_h[(u_h)_R - (u_h)_L] + (p_R - p_L)\} \cdot dr.$$

4. The method of claim 1, wherein computing the upstream flow field parameters and the downstream flow field parameters comprises computing upstream density $\rho_L$, upstream pressure $p_L$, upstream axial velocity $(u_h)_L$, upstream azimuth velocity $(u_\varphi)_L$, downstream density $\rho_R$, downstream pressure $p_R$, downstream axial velocity $(u_h)_R$, and downstream azimuth velocity $(u_\varphi)_R$, and further comprising:
computing the approximation of the total torque M according to:

$$M = 2\pi \int_{r_{min}}^{r_{max}} r^2 \rho u_h [(u_\varphi)_R - (u_\varphi)_L] \cdot dr.$$

5. The method of claim 4, further comprising computing an approximation of total mechanical power W according to:

$W = \Omega \cdot M,$ wherein $\Omega$ is the rotational speed of the blade wheel.

6. The method of claim 4, wherein computing the upstream flow field parameters and the downstream flow field parameters comprises computing upstream total enthalpy of the blade wheel $H^*_L$ and downstream total enthalpy of the blade wheel $H^*_R$ and further comprising:
computing an approximation of total mechanical power P* withdrawn from flow by the blade wheels in an incompressible fluid according to:

$$P^* = 2\pi \int_{r_{min}}^{r_{max}} r\rho u_h (H^*_R - H^*_L) \cdot dr.$$

7. The method of claim 1, wherein the turbo machine is a wide angle ducted turbo machine, and further comprising numerically simulating the upstream flow field parameters and the downstream flow field parameters using representations of radial distributions of mass, momentum, and energy jumps across the swept area of the blade wheel derived with boundary-fitted coordinate transformation $h(\xi, \eta)$ for coordinates $\xi$ and $\eta$ as $h(\xi, \eta) = \xi$, $r(\xi, \eta) = r_{min}(\xi) + \eta \cdot [r_{max}(\xi) - r_{min}(\xi)]$.

8. A system comprising:
one or more computers and one or more storage devices storing instructions that are operable, when executed by the one or more computers, to cause the one or more computers to perform operations comprising:
obtaining a plurality of parameters of a design of a blade wheel of an axial flow turbo machine, including lift coefficients and drag coefficients for the blade wheel for each of a plurality of angles of attack $\alpha_i$ and for each of a plurality of cross sections $r_j$ of the blade wheel from a minimum radius $r_{min}$ of the blade wheel to a maximum radius $r_{max}$ of the blade wheel;
obtaining mass jump conditions, momentum jump conditions, and energy jump conditions of a two-dimensional blade element model of the blade wheel, wherein the mass jump conditions, momentum jump conditions, and energy jump conditions each specify a relationship between upstream flow field parameters and downstream flow field parameters of the blade wheel;
computing upstream flow field parameters and downstream flow field parameters that satisfy the mass jump conditions, momentum jump conditions, and energy jump conditions of the two-dimensional blade element model;
computing momentum jump values across the swept area of the blade wheel using the computed upstream flow field parameters and the computed downstream flow field parameters that satisfy the mass jump conditions, momentum jump conditions, and energy jump conditions of the two-dimensional blade element model; and computing one or more turbine parameters for the axial flow turbo machine including computing an approximation of total torque for the design of the blade wheel by aggregating the momentum jump values across the swept area of the blade wheel; and outputting the design of the blade wheel based on the computed one or more turbine parameters.

9. The system of claim 8, wherein computing the momentum jump values from the computed upstream flow field parameters and the computed downstream flow field parameters comprises:

computing averaged directions $\beta_i$ of velocity components of the upstream flow field parameters and the downstream flow field parameters; and computing each momentum jump values $m_i$ according to: $m_i = q \cdot \sigma \cdot [C_D \sin \beta_i + C_L \cos \beta_i]$, where q is an average dynamic pressure, $C_D$ are drag coefficients of the blade wheel, $C_L$ are lift coefficients of the blade wheel, and wherein $\sigma$ is a solidity factor of the blade wheel.

10. The system of claim 8, wherein computing the upstream flow field parameters and the downstream flow field parameters comprises computing upstream density $\rho_L$, upstream pressure $p_L$, upstream axial velocity $(u_h)_L$, upstream azimuth velocity $(u_\varphi)_L$, downstream density $\rho_R$, downstream pressure $p_R$, downstream axial velocity $(u_h)_R$, and downstream azimuth velocity $(u_\varphi)_R$, and wherein the operations further comprise:

computing an approximation of total drag X produced by the blade wheel according to:

$$X = -2\pi \int_{r_{min}}^{r_{max}} r\{\rho u_h[(u_h)_R - (u_h)_L] + (p_R - p_L)\} \cdot dr.$$

11. The system of claim 8, wherein computing the upstream flow field parameters and the downstream flow field parameters comprises computing upstream density $\rho_L$, upstream pressure $p_L$, upstream axial velocity $(u_h)_L$, upstream azimuth velocity $(u_\varphi)_L$, downstream density $\rho_R$, downstream pressure $p_R$, downstream axial velocity $(u_h)_R$, and downstream azimuth velocity $(u_\varphi)_R$, and wherein the operations further comprise:

computing the approximation of the total torque M according to:

$$M = 2\pi \int_{r_{min}}^{r_{max}} r^2 \rho u_h [(u_\varphi)_R - (u_\varphi)_L] \cdot dr.$$

12. The system of claim 11, wherein the operations further comprise computing an approximation of total mechanical power W according to:

$W = \Omega \cdot M$, wherein $\Omega$ is the rotational speed of the blade wheel.

13. The system of claim 11, wherein computing the upstream flow field parameters and the downstream flow field parameters comprises computing upstream total enthalpy of the blade wheel $H^*_L$ and downstream total enthalpy of the blade wheel $H^*_R$ and wherein the operations further comprise:

computing an approximation of total mechanical power $P^*$ withdrawn from flow by the blade wheels in an incompressible fluid according to:

$$P^* = 2\pi \int_{r_{min}}^{r_{max}} r\rho u_h (H^*_R - H^*_L) \cdot dr.$$

14. The system of claim 8, wherein the turbo machine is a wide angle ducted turbo machine and wherein the operations further comprise:

numerically simulating the upstream flow field parameters and the downstream flow field parameters using representations of radial distributions of mass, momentum, and energy jumps across the swept area of the blade wheel derived with boundary-fitted coordinate transformation $h(\xi, \eta)$ for coordinates $\xi$ and $\eta$ as $h(\xi, \eta) = \xi$, $r(\xi, \eta) = r_{min}(\xi) + \eta \cdot [r_{max}(\xi) - r_{min}(\xi)]$.

15. A computer program product, encoded on one or more non-transitory computer storage media, comprising instructions that when executed by one or more computers cause the one or more computers to perform operations comprising:

obtaining a plurality of parameters of a design of a blade wheel of an axial flow turbo machine, including lift coefficients and drag coefficients for the blade wheel for each of a plurality of angles of attack $\alpha_i$ and for each of a plurality of cross sections $r_j$ of the blade wheel from a minimum radius $r_{min}$ of the blade wheel to a maximum radius $r_{max}$ of the blade wheel;

obtaining mass jump conditions, momentum jump conditions, and energy jump conditions of a two-dimensional blade element model of the blade wheel, wherein the mass jump conditions, momentum jump conditions, and energy jump conditions each specify a relationship between upstream flow field parameters and downstream flow field parameters of the blade wheel;

computing upstream flow field parameters and downstream flow field parameters that satisfy the mass jump conditions, momentum jump conditions, and energy jump conditions of the two-dimensional blade element model;

computing momentum jump values across the swept area of the blade wheel using the computed upstream flow field parameters and the computed downstream flow field parameters that satisfy the mass jump conditions, momentum jump conditions, and energy jump conditions of the two-dimensional blade element model; and computing one or more turbine parameters for the axial flow turbo machine including computing an approximation of total torque for the design of the blade wheel by aggregating the momentum jump values across the swept area of the blade wheel; and outputting the design of the blade wheel based on the computed one or more turbine parameters.

16. The computer program product of claim 15, wherein computing the momentum jump values from the computed upstream flow field parameters and the computed downstream flow field parameters comprises:

computing averaged directions $\beta_i$, of velocity components of the upstream flow field parameters and the downstream flow field parameters; and computing each momentum jump values $m_i$ according to: $m_i = q \cdot \sigma \cdot [C_D \sin \beta_i + C_L \cos \beta_i]$, where q is an average dynamic pressure $C_D$ are drag coefficients of the blade wheel, $C_L$ are lift coefficients of the blade wheel, and wherein $\sigma$ is a solidity factor of the blade wheel.

17. The computer program product of claim 15, wherein computing the upstream flow field parameters and the downstream flow field parameters comprises computing upstream density $\rho_L$, upstream pressure $p_L$, upstream axial velocity $(u_h)_L$, upstream azimuth velocity $(u_\varphi)_L$, downstream density $\rho_R$, downstream pressure $p_R$, downstream axial velocity $(u_h)_R$, and downstream azimuth velocity $(u_\varphi)_R$, and wherein the operations further comprise:

computing an approximation of total drag X produced by the blade wheel according to:

$$X = -2\pi \int_{r_{min}}^{r_{max}} r\{\rho u_h[(u_h)_R - (u_h)_L] + (p_R - p_L)\} \cdot dr.$$

18. The computer program product of claim 15,
wherein computing the upstream flow field parameters and the downstream flow field parameters comprises computing upstream density $\rho_L$, upstream pressure $p_L$, upstream axial velocity $(u_h)_L$, upstream azimuth velocity $(u_\varphi)_L$, downstream density $\rho_R$, downstream pressure $p_R$, downstream axial velocity $(u_h)_R$, and downstream azimuth velocity $(u_\varphi)_R$, and wherein the operations further comprise:
computing the approximation of the total torque M according to:

$$M = 2\pi \int_{r_{min}}^{r_{max}} r^2 \rho u_h[(u_\varphi)_R - (u_\varphi)_L] \cdot dr.$$

19. The computer program product of claim 18, wherein the operations further comprise computing an approximation of total mechanical power W according to:

$$W = \Omega \cdot M,$$

wherein $\Omega$ is the rotational speed of the blade wheel.

20. The computer program product of claim 18, wherein computing the upstream flow field parameters and the downstream flow field parameters comprises computing upstream total enthalpy of the blade wheel $H^*_L$ and downstream total enthalpy of the blade wheel $H^*_R$ and wherein the operations further comprise:
computing total mechanical power P* withdrawn from flow by the blade wheels in an incompressible fluid according to:

$$P^* = 2\pi \int_{r_{min}}^{r_{max}} r\rho u_h(H^*_R - H^*_L) \cdot dr.$$

21. The computer program product of claim 15, wherein the turbo machine is a wide angle ducted turbo machine and wherein the operations further comprise:
numerically simulating the upstream flow field parameters and the downstream flow field parameters using representations of radial distributions of mass, momentum, and energy jumps across the swept area of the blade wheel derived with boundary-fitted coordinate transformation $h(\xi, \eta)$ for coordinates $\xi$ and $\eta$ as $h(\xi, \eta)=\xi$, $r(\xi, \eta)=r_{min}(\xi)+\eta \cdot [r_{max}(\xi)-r_{min}(\xi)]$.

* * * * *

UNITED STATES PATENT AND TRADEMARK OFFICE
CERTIFICATE OF CORRECTION

| | |
|---|---|
| PATENT NO. | : 9,644,599 B2 |
| APPLICATION NO. | : 14/215937 |
| DATED | : May 9, 2017 |
| INVENTOR(S) | : Pavel Babikov et al. |

It is certified that error appears in the above-identified patent and that said Letters Patent is hereby corrected as shown below:

In the Claims

Column 21, Line 7, in Claim 1: delete "wheel;" and insert --wheel--, therefor.

Column 24, Line 57, in Claim 16: delete "$\beta_i$," and insert --$\beta_i$--, therefor.

Column 24, Line 62, in Claim 16: after "pressure" insert --,--.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*